US006413457B1

(12) United States Patent
Fukushima et al.

(10) Patent No.: US 6,413,457 B1
(45) Date of Patent: Jul. 2, 2002

(54) POWDER PRESSING APPARATUS, PUNCH, METHOD FOR PRESSING POWDER AND METHOD FOR MANUFACTURING THE PUNCH

(75) Inventors: Sadatoshi Fukushima, Takatsuki; Kazuo Noguchi, Saga, both of (JP)

(73) Assignee: Sumitomo Special Metals Co., Ltd., Osaka (JP)

(*) Notice: Subject to any disclaimer, the term of this patent is extended or adjusted under 35 U.S.C. 154(b) by 0 days.

(21) Appl. No.: 09/469,620

(22) Filed: Dec. 22, 1999

(30) Foreign Application Priority Data

Dec. 28, 1998 (JP) .......................................... 10-377138

(51) Int. Cl.$^{7}$ ................................................ B29C 43/04

(52) U.S. Cl. ....................... 264/109; 425/346; 425/351; 425/352; 425/469

(58) Field of Search ..................... 264/86, 109; 425/84, 425/346, 351, 352, 469

(56) References Cited

U.S. PATENT DOCUMENTS 6,004,120 A 12/1999 Matsubara et al. ........... 425/78
6,056,532 A * 5/2000 Pagel ......................... 425/469

FOREIGN PATENT DOCUMENTS

| | | |
|---|---|---|
| JP | 61-54601 | 3/1986 |
| JP | 4-284605 | 10/1992 |
| JP | 6-218587 | 8/1994 |
| JP | 6-330102 | 11/1994 |
| JP | 7-249510 | 9/1995 |
| TW | 287975 | 10/1996 |

OTHER PUBLICATIONS

Notice of Rejection to the corresponding Taiwanese Patent Application No. 88122999 (and translation thereof).

* cited by examiner

*Primary Examiner*—Mary Lynn Theisen
(74) *Attorney, Agent, or Firm*—Armstrong, Westerman, & Hattori, LLP

(57) ABSTRACT

A powder pressing apparatus comprises an upper punch, a lower punch and a die. A compact is formed by pressing a powder loaded in a cavity formed by the upper punch, the lower punch and the die. At least either one of the upper punch and the lower punch has a contacting surface for contact with the compact, formed with grooves. The compact adhering to the upper punch or the lower punch may be sprayed with a liquid such as water. Thereafter, the compact adhering to the upper punch or the lower punch is removed therefrom. Preferably, the grooves should be formed by milling at least at an end portion of the contacting surface, the contacting surface should have a surface roughness Ra=0.05 $\mu$m~25 $\mu$m, the powder should have an average grain diameter of not greater than 1 $\mu$m, the grooves should be formed at an interval of 0.1 mm~2.0 mm to a depth of 0.2 $\mu$m~100.0 $\mu$m.

29 Claims, 9 Drawing Sheets

POWDER PRESSING APPARATUS, PUNCH, METHOD FOR PRESSING POWDER AND METHOD FOR MANUFACTURING THE PUNCH

BACKGROUND OF THE INVENTION

1. Field of the Invention

The present invention relates to a powder pressing apparatus, a punch, a method for pressing a powder, and a method for manufacturing the punch. More specifically, the present invention relates to a powder pressing apparatus, a punch, a method for pressing a powder, and a method for manufacturing the punch, used in a wet pressing or a dry pressing for manufacturing a compact such as a magnet.

2. Description of the Related Art

According to a powder pressing apparatus of this kind, an upper punch provided with a filter is lowered, then a powder added with water into a form of slurry is loaded in a cavity formed by the upper punch, a lower punch and a die, and then the powder is pressed from above by the upper punch to form a compact while squeezing the water. Then, after the die is lowered, the compact adhering to the lower punch is collected by a vacuum suction.

A contacting surface of the lower punch to which the compact adheres in the above operation is a smooth surface polished by a discharge machining and then finished by lapping.

However, according to the above convention, there are problems if an average grain diameter of the powder is not greater than 1.0 $\mu$m, or if the compact is very large. Specifically, in such a case, it becomes difficult to remove the compact from the lower punch, the compact becomes susceptible to fracture by pressing, and a longer time is needed to remove the compact. These problems are caused by a strong adhesion between the compact and the contacting surface of the lower punch finished to a mirror surface by the lapping.

In order to eliminate the cause, two methods were tried. The contacting surface of the lower punch was only discharge-machined in one method, and in the other method the contacting surface of the lower punch was discharge-machined and then ground (coarse polishing operation). However, separability was not improved in either of the methods.

SUMMARY OF THE INVENTION

It is therefore an object of the present invention to provide a powder pressing apparatus, a punch, a method for pressing a powder, and a method for manufacturing the punch, capable of improving the separability.

According to an aspect of the present invention, there is provided a powder pressing apparatus for formation of a compact by pressing a powder loaded in a cavity formed by an upper punch, a lower punch and a die, wherein at least either one of the upper punch and the lower punch has a contacting surface for contact with the compact, formed with a groove.

According to another aspect of the present invention, there is provided a punch used in a powder pressing apparatus for formation of a compact by pressing a powder, wherein the punch has a contacting surface for contact with the compact, formed with a groove.

According to still another aspect of the present invention, there is provided a method for manufacturing a punch used in a powder pressing apparatus for formation of a compact, wherein the method comprises a step of forming a groove in a contacting surface of the punch which is to contact the compact.

If it is assumed that the lower punch has the contacting surface formed with the groove, and the compact is removed from the lower punch, according to the present invention, since the contacting surface of the lower punch is formed with the groove, it is presumed that a separating agent is held adequately and uniformly in the entire contacting surface of the lower punch, and that air is easily drawn in between the lower punch and the compact, resultingly preventing adhesion of the compact to the punch at a time of a pressing operation. Further, before the compact is removed from the lower punch, since a pressure acting onto the compact from above is removed by raising the upper punch, it is presumed that a spring back force is released within the compact, developing a gap between the compact and the groove, making the compact off the lower punch. The gap between the compact and the lower punch decreases the adhesion between the two, thereby improving the separability and making easy to remove the compact.

According to the present invention, preferably, the groove is formed at least at an end portion of the contacting surface. It is presumed that this arrangement allows the air to be drawn in more easily between the punch and the compact, further decreasing the adhesion between the two, thereby improving further the separability.

Further, preferably, the contacting surface has a surface roughness Ra=0.05 $\mu$m~25 $\mu$m. If the surface roughness is too large, grains of the powder come into the groove, making the compact difficult to separate, whereas if the surface roughness is too small, the adhesion between the punch and the compact is increased to deteriorate the separability. If the surface roughness is set to Ra=0.05 $\mu$m~25 $\mu$m, it is presumed that the grains of the powder are prevented from coming into the groove and therefore will not fill the gap between the punch and the compact, and that the separating agent remains adequately within the groove at the time of pressing operation, distributing uniformly in the entire contacting surface, resulting in an improved separability. Since the powder grains do not clog the groove as described above, the punch can be used repeatedly.

Further, preferably, the powder has an average grain diameter not greater than 1 $\mu$m. The effect of the present invention becomes significant with the above arrangement. A reason for this is that in general, when the average grain diameter of the powder becomes smaller, a greater adhesiveness is developed between the compact and the contacting surface of he lower punch, deteriorating the separability. However, if he groove is formed in the contacting surface as according to he present invention, it is presumed that the separating agent can be held uniformly in the entirety of the contacting surface even if the average grain diameter of the powder is small, and therefore the separability is improved.

Preferably, the groove is formed at an interval of 0.1 mm~2.0 mm, and to a depth of 0.2 $\mu$m~100.0 $\mu$m. With the above arrangement, the contacting surface of the punch can be formed with the groove consistently and efficiently.

Further, preferably, the groove is formed by milling. With such an arrangement, the contacting surface of the punch can be easily formed with a desired groove. It should be noted here, that a ball end mill or a flat end mill is selectively used depending on a shape of the compact.

According to another aspect of the present invention, there is provided a powder pressing apparatus for formation of a compact by pressing a powder loaded in a cavity formed by an upper punch, a lower punch and a die, wherein the apparatus comprises liquid spraying means for spraying a liquid to the compact formed by pressing the powder and adhered to the upper punch or the lower punch.

According to still another aspect of the present invention, there is provided a method for pressing powder comprising: a first step of forming a compact by pressing a powder loaded in a cavity formed by an upper punch, a lower punch and a die; a second step of spraying a liquid to the compact adhering to the upper punch or the lower punch; and a third step of removing the compact from the upper punch or the lower punch to which the compact adheres, after spraying the liquid.

According to the above invention, particularly when the compact does not separate from the punch, the liquid can be sprayed to the compact adhering to the punch, letting the liquid percolate between the punch and the compact to decrease adhesion between the punch and the compact, improving the separability of the compact, thereby making easy to remove the compact.

According to the present invention, preferably, the sprayed liquid is water. With the above arrangement, it becomes possible to improve the separability of the compact at a low cost, in an environmentally friendly way, without altering characteristics of the compact.

The above-described powder pressing apparatus, the punch, the method for pressing a powder, and the method for manufacturing the punch are effective in wet pressing.

The above object, other objects, features, aspects and advantages of the present invention will become clearer from the following detailed description of embodiments to be presented with reference to the accompanying drawings.

DETAILED DESCRIPTION OF THE PREFERRED EMBODIMENTS

Embodiments of the present invention will be described hereinafter with reference to the drawings.

Figure 1:
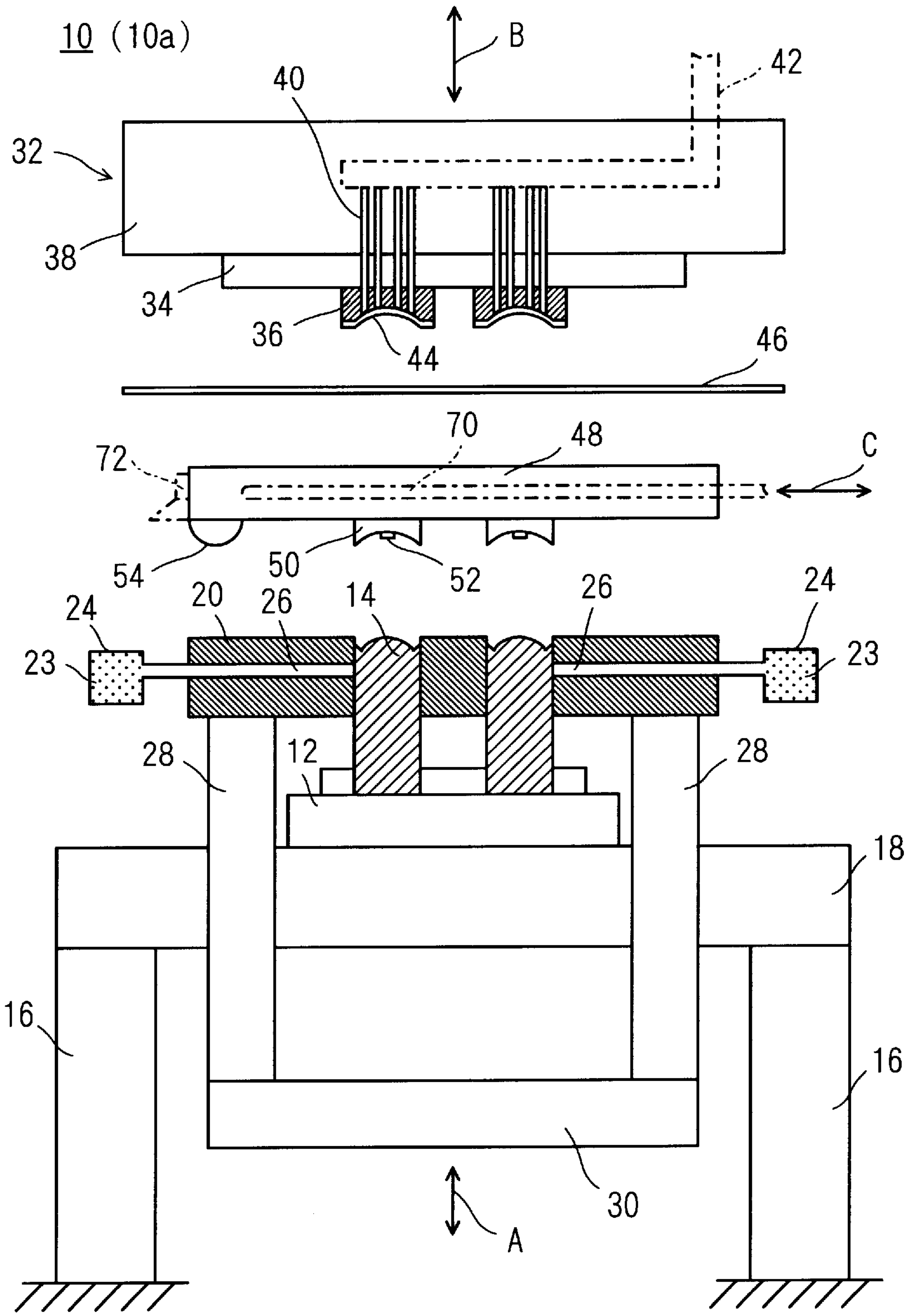
FIG. 1 is a conceptual diagram of an embodiment of the present invention.
Figure 2:
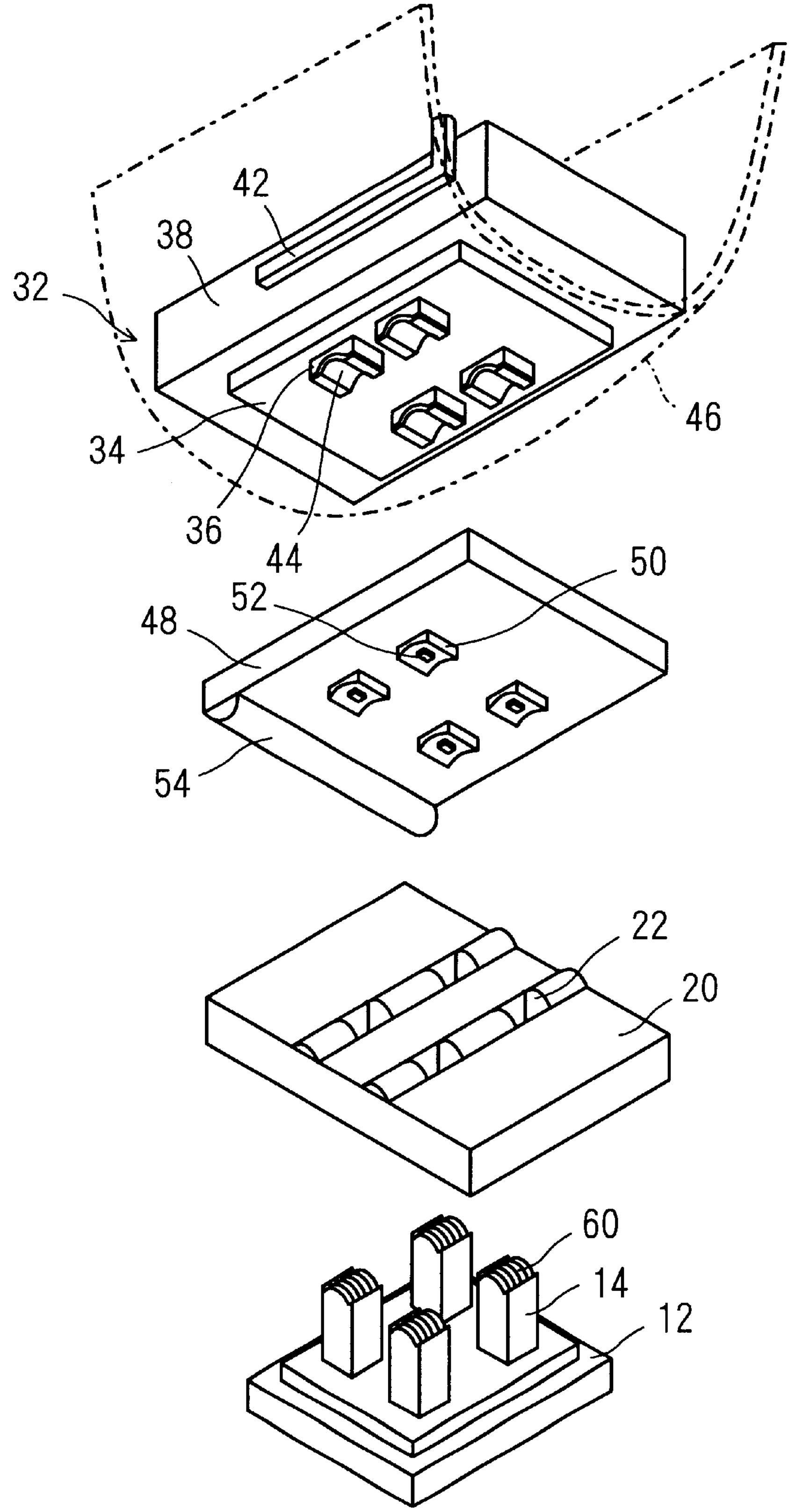
FIG. 2 shows a primary portion of the embodiment shown in FIG. 1, including a perspective view of a lower punch and a die as seen from above, and a perspective view of an upper punch and an unloader as seen from below.

Referring to FIGS. 1 and 2, a powder pressing apparatus 10 according to an embodiment of the present invention is a pressing apparatus for manufacture of a compact 68 (to be described later) such as a magnet by a wet pressing method, comprising generally prismatic lower punches 14 disposed on a fixing table 12. The fixing table 12 is disposed on a lower punch supporting table 18 supported by pillars 16. According to the present embodiment, the fixing table 12 is disposed with four lower punches 14.

The powder pressing apparatus 10 further comprises a die 20. The die 20 is formed with through holes 22, each of which can be inserted by a corresponding one of the lower punches 14. Each of the through holes 22 is shaped and sized generally to the same shape and size of a cross section of the corresponding lower punch 14. According to the present embodiment, four through holes 22 are formed in correspondence to the lower punches 14. The die 20 is provided, in an adjacency thereto, with a powder reservoir 24 for storing a powder 23 in a form of slurry. Each of the through holes 22 is communicated with the powder reservoir 24 via a powder loading path 26.

The die 20 with the above arrangement is supported by the die supporting table 30 via poles 28. The die 20 can be moved vertically relative to the lower punch 14 by moving the die supporting table 30 in vertical directions (in directions shown by Arrow A) using an unillustrated cylinder for example.

An upper punch 32 is disposed above the die 20. The upper punch 32 includes punch portions 36 each mounted on a bottom surface of the fixing table 34 at a location corresponding to a mating one of the lower punches 14. The fixing table 34 is mounted on a lower surface of the supporting table 38. The upper punch 32 has an inside provided with a water discharge path 40 as a water flowing channel having a diameter of about 2 mm, with an end opening on a surface of the punch portion 36. The water discharge path 40 is connected with a water discharge pipe 42 provided on a side surface of the fixing table 38.

As will be clearly understood from FIG. 2, each of the punch portions 36 has a concave surface in correspondence to an upper surface of the compact 68. The surface of the punch portion 36 is formed with a filter cloth 44 for absorbing water from the slurry of powder 23. Likewise, below the upper punch 32, a winding-type filter paper 46 is disposed for absorbing water from the powder 23. Thus, at a time of pressing operation, the water contained in the powder 23 is absorbed by the filter paper 46 and the filter cloth 44, and is discharged through the water discharge path 40 and the water discharge pipe 42. The filter paper 46 is wound generally at each stroke (one-time use). The upper punch 32 is vertically moved (in directions shown by Arrow B) by an unillustrated cylinder for example, to predetermined positions relative to the lower punch 14 according to respective steps of the pressing operation.

Further, an unloader 48 for collecting the compact 68 formed by the pressing operation is provided between the upper punch 32 and the die 20. As understood clearly from FIG. 2, the unloader 48 has a bottom surface formed with holding portions 50 each having a surface mating the upper surface of the compact 68. Each of the holding portions 50 has a center portion provided with a sucking portion 52 for collecting the compact 68 by suction. Further, the unloader 48 has an end provided with spray nozzle 54 for spraying a separating agent containing kerosene for example as a primarily ingredient. After the compact 68 is removed from the lower punch 14, in order to easily remove the compact 68 from the lower punch 14 in the next cycle of the pressing operation, the separating agent is sprayed from the spraying nozzles 54 to contacting surfaces 56 (to be described later) of the lower punches 14. The unloader 48 as described above can be positioned at or removed from above the lower punches 14 by moving horizontally (in directions shown by Arrow C).

According to the powder pressing apparatus 10 with the above arrangement, attention should be paid to the lower punches 14.

Figure 3:
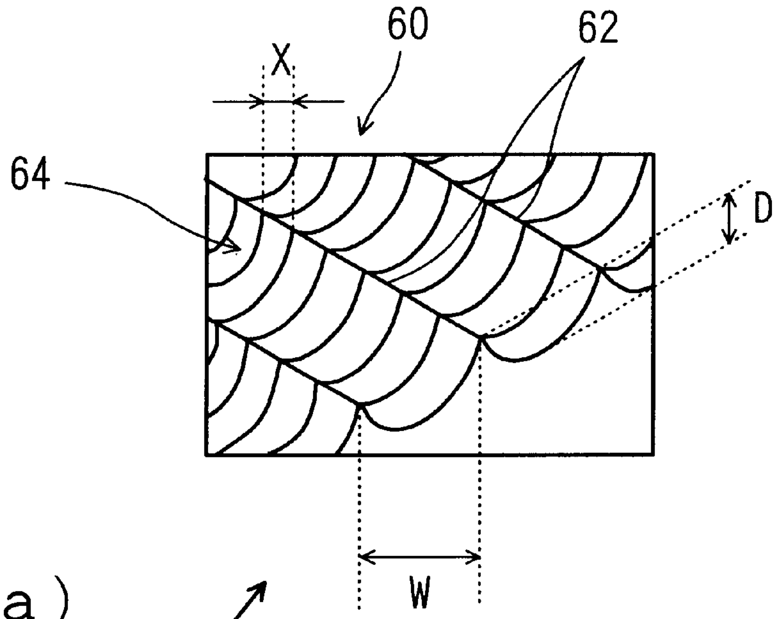
FIG. 3(*a*) is a perspective view of the lower punch, FIG. 3(*b*) is an enlarged view illustrating a portion of grooves.
Figure 3:
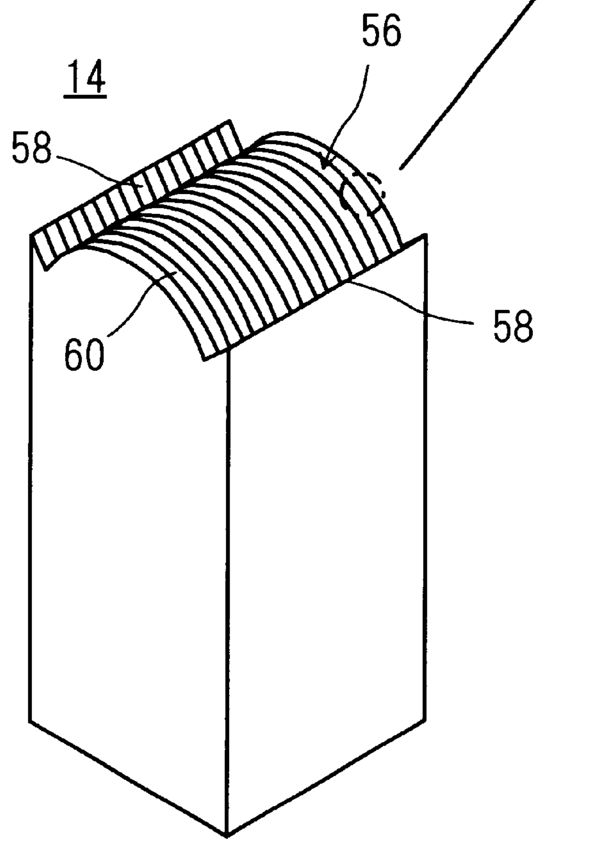
Figure 4:
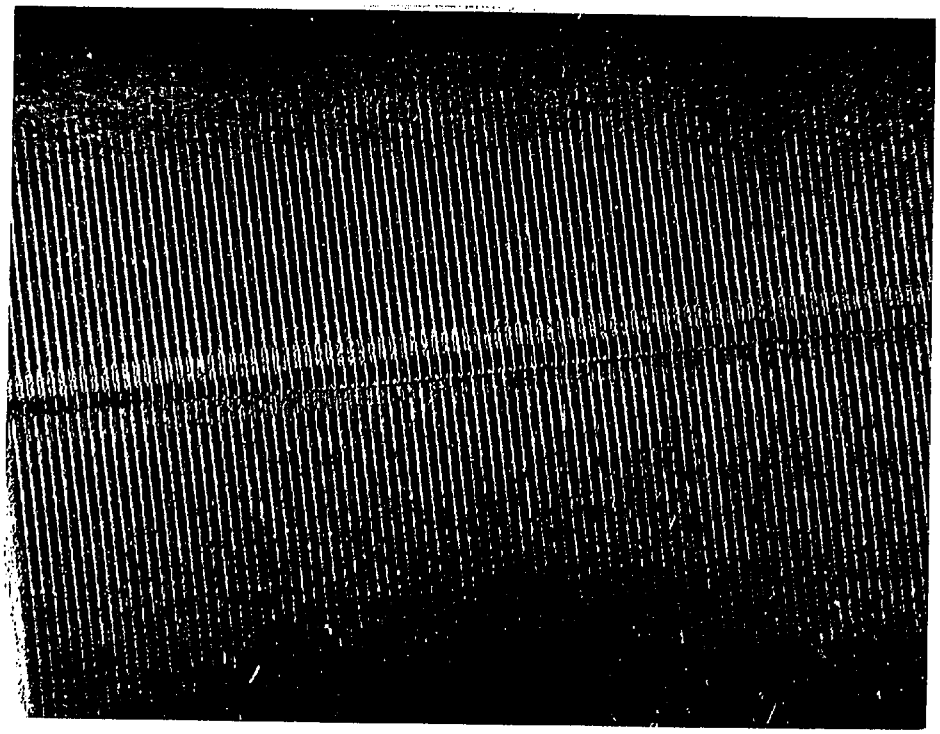
FIG. 4(*a*) is an illustration showing a state of contacting surface of the lower punch, FIG. 4(*b*) is an illustration showing an enlarged view of the portion of grooves.
Figure 4:
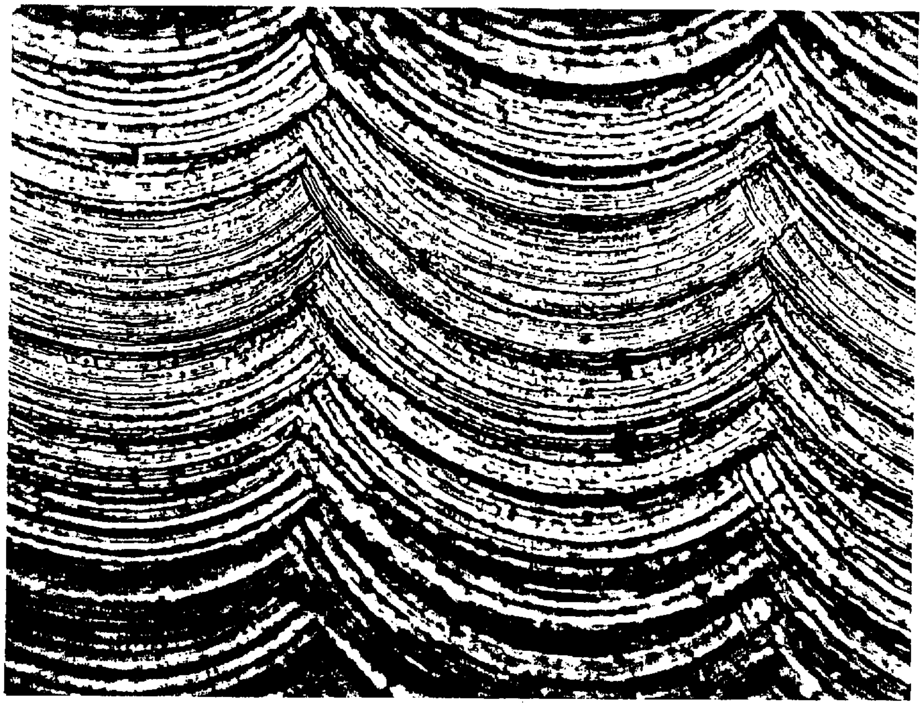
Figure 5A:
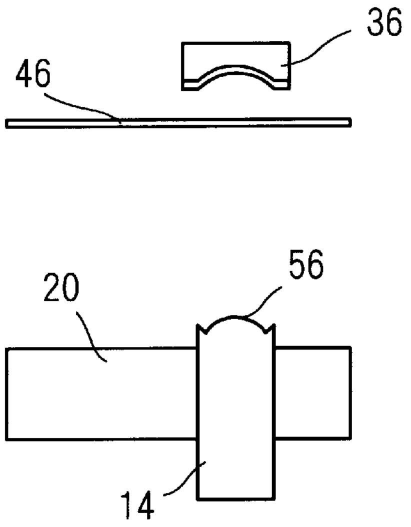
FIG. 5(*a*) through FIG. 5(*d*) are illustrations showing steps of operations according to the embodiment shown in FIG. 1.
Figure 5B:
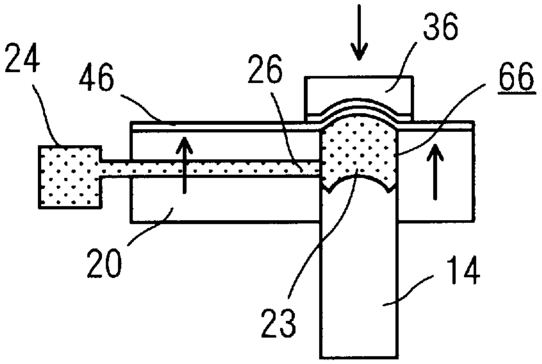
Figure 5C:
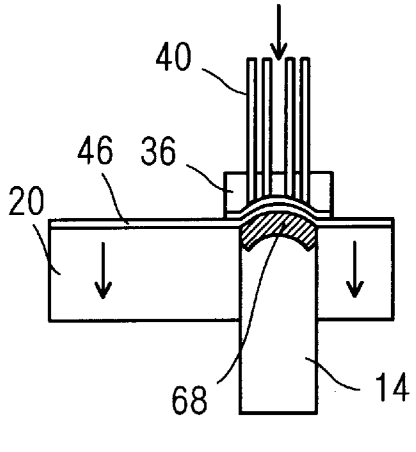
Figure 5D:
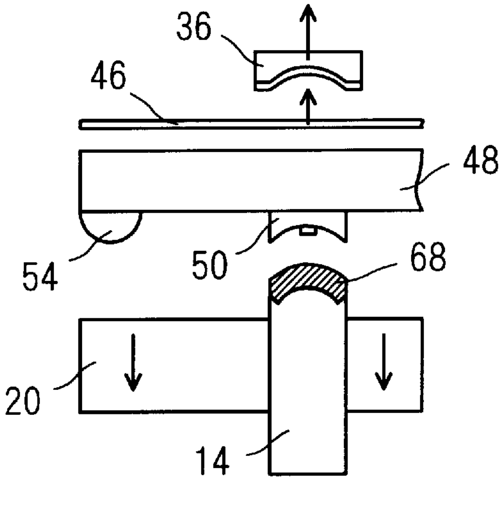

As shown in FIG. 3(*a*), the upper surface of each of the lower punches 14, i.e. the contacting surface 56 for contacting the powder 23, is formed into a curve to match a shape of the desired compact 68. The contacting surface 56 has two end portions each formed with a rising flange portion 58 for providing the compact 68 with chambered portions. Further, the contacting surface 56 is entirely formed with grooves 60 running along the curve. Further, as shown in FIG. 3(*b*), wavy grooves 64 are formed between adjacent ridge portions 62 of the grooves 60. State of the grooves 60 should be seen clearly in FIGS. 4(*a*) and 4(*b*). The grooves 60 are formed as shown in FIG. 4(*a*), whereas the wavy grooves 64 between the ridge portions 62 of the grooves 60 are formed as shown in FIG. 4(*b*).

The grooves 60 are formed by milling operation using a ball end mill for example. In the milling operation, the ball end mill is turned and advanced straightly with a ball-shaped cutting edge being moved in a circle, cutting the contacting surface 56 to form the grooves 60 along the curve of the contacting surface 56 for example.

A distance between the ridge portions 62 of the grooves 60, i.e. an interval W between the grooves 60, is made 0.1 mm~2.0 mm, and a depth D of the grooves 60 is made to 0.2 $\mu$m~100.0 $\mu$m.

In the milling operation, the ball end mill should have a tip radius of 3 mm or 5 mm in general, if the shape of the compact 68 is an arc. The ball end mill of the above size is suitable for forming the grooves 60 having the interval W and the depth D being within the above-mentioned ranges. If the ball end mill has the tip radius greater than 5 mm, the flange portion 58 can be ground off during the formation of the grooves 60, failing in the formation of the flange portion 58 having a uniform thickness. As a result, the obtained compact 68 has an inconsistent chambered portion, or the compact 68 can have a portion lacking the chamfer. On the other hand, the ball end mill having the tip radius smaller than 3 mm takes a longer time for the machining, resulting in a poor operation efficiency. For these reasons, the ball end mill having the tip radius greater than 5 mm or smaller than 3 mm is not suitable for the formation of the groove 60. It should be noted here that if an average grain diameter of the powder 23 is not greater than 1.0 $\mu$m, the interval W of the grooves 60 should preferably be 0.1 mm~0.5 mm, with the depth D of the groove 0.2 $\mu$m~10.0 $\mu$m. An interval X between the grooves 64 is set to about 0.5 $\mu$m~10.0 $\mu$m.

The contacting surface 56 of the lower punch 14 should preferably have a surface roughness Ra=0.05 $\mu$m~25 $\mu$m. The Japanese Industrial Standards provides a following set of standards in the surface roughness: Ra($\mu$m)=0.025, 0.05, 0.1, 0.2, 0.4, 0.8, 1.6, 3.2, 6.3, 12.5, 25, 50, and 100. If the surface roughness Ra=0.025 $\mu$m or smaller, groove formation becomes difficult, whereas if Ra=50 $\mu$m or greater, inconsistency becomes significant in the compact 68, dimensional errors in products increase, making these ranges not suitable for mass production. For these reasons, a range of Ra=0.05 $\mu$m~25 $\mu$m free from the above problems is preferred as the range of surface roughness. If the surface roughness is within this range, it is presumed that the grains of the powder 23 are prevented from coming into the grooves 60 and therefore will not fill the gap between the lower punch 14 and the compact 68, and that the separating agent remains adequately within the grooves 60 at the time of pressing operation, distributing uniformly in the entire contacting surface 56, resulting in an improved separability. It should be noted here that the surface roughness Ra=0.1 $\mu$m~3.2 $\mu$m is preferred if the average grain diameter of the powder 23 is not greater than 1.0 $\mu$m.

Substantial effect can be made if the average grain diameter of the powder 23 is not greater than 1.0 $\mu$m. A reason for this is that in general, when the average grain diameter of the powder 23 becomes smaller, viscosity increases to cause greater adhesiveness between the compact 68 and the contacting surface 56 of the lower punch 14, deteriorating the separability. However, if the grooves 60 are formed in the contacting surface 56, it is presumed that the separating agent can be distributed uniformly in the entire contacting surface 56, thereby improving the separability.

It should be noted here that the grooves 60 may be formed vertically or obliquely to a direction of curve of the contacting surface 56. Further, the grooves 60 may be formed from an end portion of the contacting surface 56 toward a center portion thereof, and still further, may not be formed in the enter portion.

Next, operations of the powder pressing apparatus 10 will be described with reference to FIG. 5(*a*) through FIG. 5(*d*).

Starting first from a state shown in FIG. 5(*a*), after a previous pressing cycle is completed, with the compact 68 having been removed and transported by the unloader 48, the contacting surface 56 of the lower punch 14 is higher than the upper surface of the die 20. Then, as shown in FIG. 5(*b*), the die 20 is raised whereas the upper punch 32, i.e. the punch portion 36 is lowered, to form a cavity 66 by the punch portion 36, the lower punch 14, and the die 20. The closed cavity 66 is then loaded with the slurry of powder 23 coming from the powder reservoir 24 through the powder loading path 26. The slurry of powder 23 used in this operation is a water solution having a concentration of 55% through 75% by weight percentage.

Then, as shown in FIG. 5(*c*), the punch portion 36 and the die 20 are lowered to press the powder 23, squeezing only the water out of the slurry of powder 23. The water is discharged through the water discharge path 40 of the upper punch 32, forming the compact 68. It should be noted here that if a magnet is formed, the powder 23 is pressed within a magnetic field.

After the pressing operation is complete, as shown in FIG. 5(*d*), the punch portion 36 is raised whereas the die 20 is lowered to expose the compact 68 out of the upper surface of the die 20. Then, the unloader 48 is brought above the compact 68 and holds the compact 68 at the holding portion 50 by a vacuum suction from the sucking portion 52 of the unloader 48. Then, the compact 68 is carried away by horizontal movement of the unloader 48. Thereafter, the separating agent is sprayed from the spray nozzle 54 to the contacting surface 56 of the lower punch 14 for preventing the adhesion to the compact 68 in the next cycle of the pressing operation.

According to the powder pressing apparatus 10 as above, due to the grooves 60 formed on the contacting surface 56 of the lower punch 14, adhesion between the compact 68 and the lower punch 14 is prevented at the time of pressing operation, presumably because the separating agent is retained adequately and uniformly in the entire surface of the contacting surface 56 of the lower punch 14, and air can be drawn in more easily between the contacting surface 56 and the compact 68. During the above, the separating agent percolates into the grooves 64 formed on the contacting surface 56, allowing the contacting surface 56 to retain the separating agent more stably.

Figure 6:
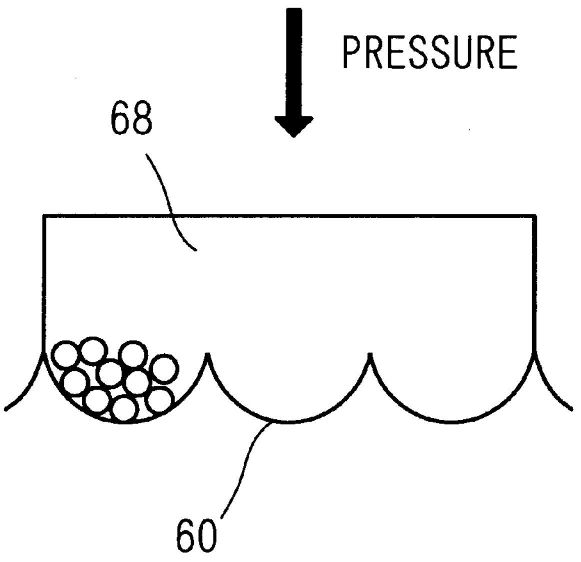
FIG. 6(*a*) through FIG. 6(*c*) are conceptual diagrams illustrating a spring back force of a compact.
Figure 6:
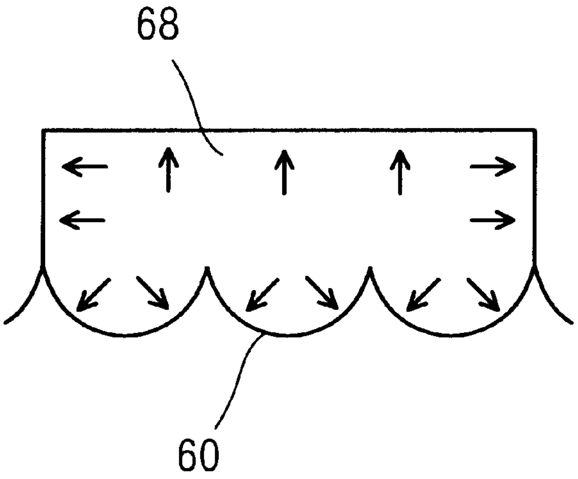
Figure 6:
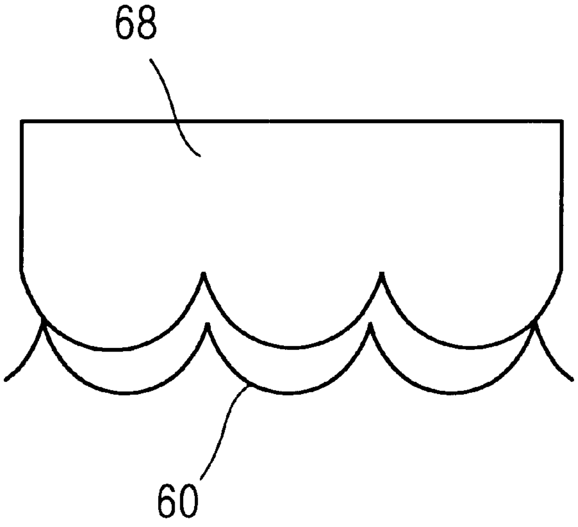

Further, the upper punch 32 is moved upward when the compact 68 is removed from the lower punch 14, thereby removing the pressure from above having been acted to the compact 68 as shown in FIG. 6(*a*). Thus, as shown in FIG. 6(*b*), it is presumed that there is a release of spring back force within the compact 68, allowing the grains having been compressed now to expand. As a result, as shown in FIG. 6(*c*), a gap is developed between the grooves 60 and the compact 68, making the compact 68 afloat, creating a space between the lower punch 14 and the compact 68, drawing the air into the space via the groove 60, relieving the adhesion between the punch 14 and the compact 68, and improving the separability. As a result, collection of the compact 68 becomes easy, virtually eliminating a halt during the operation cycle due to inseparable adhesion between the compact 68 and the lower punch 14, thereby improving operation efficiency. It should be noted here that the spring back force is presumed to be acting not only to the grooves 60 but also to the grooves 64.

Further improvement can be achieved in the separability by forming the grooves 60 at least at an end portion of the contacting surface 56, presumably because the formation of such grooves further promotes the air to be drawn in between the lower punch 14 and the compact 68.

Therefore, according to the powder pressing apparatus 10 shown in FIG. 1, the improvement in separability can reduce fracture/crack of the compact 68 at the time of collecting, resulting in improved yield. Further, there is no need to spray water, making possible to eliminate a step from a pressing cycle, resulting in a shorter cycle time per pressing operation and substantially improved production efficiency.

Next, Tables 1 and 2 show results of experiments conducted by using the powder pressing apparatus 10.

The powder pressing apparatus used in the experiments summarized in Tables 1 through 3 is an apparatus capable of manufacturing thirty two (32) compacts from one pressing cycle. The term "number of non-separation" means the number of halts of the apparatus per 60 strokes (i.e. per 60 pressing cycles) due to the inseparable adhesion between the lower punch 14 and the compact.

Table 1 shows data about the average grain diameter of the powder 23. Table 1(a) and Table 1(b) show results when the contacting surface 56 of the lower punch 14 was machined by milling and by lathing respectively.

TABLE 1

Average Grain Diameter

| Average Grain Diameter (μm) | Surface Roughness Ra (μm) | Groove Depth (μm) | Groove Interval (mm) | Number of Non-separation |
|---|---|---|---|---|
| (a) Machining method: Milling | | | | |
| 0.4 | 0.4 | 0.25 | 0.1 | 0~1/60 |
| 0.5 | 0.4 | 0.25 | 0.1 | 0~1/60 |
| 0.65 | 0.4 | 0.25 | 0.1 | 0/60 |
| 0.7 | 0.4 | 0.25 | 0.1 | 0/60 |
| 0.8 | 0.4 | 0.25 | 0.1 | 0/60 |
| 0.9 | 0.4 | 0.25 | 0.1 | 0/60 |
| 1.0 | 0.4 | 0.25 | 0.1 | 0/60 |

TABLE 1-continued

Average Grain Diameter

| Average Grain Diameter (μm) | Surface Roughness Ra (μm) | Groove Depth (μm) | Groove Interval (mm) | Number of Non-separation |
|---|---|---|---|---|
| 1.2 | 0.4 | 0.25 | 0.1 | 0/60 |
| 1.4 | 0.4 | 0.25 | 0.1 | 0/60 |
| 1.6 | 0.4 | 0.25 | 0.1 | 0/60 |
| (b) Machining method: Lathe | | | | |
| 0.4 | 0.4 | | | 10~15/60 |
| 0.5 | 0.4 | | | 10~15/60 |
| 0.65 | 0.4 | | | 5~8/60 |
| 0.7 | 0.4 | | | 5~8/60 |
| 0.8 | 0.4 | | | 3~5/60 |
| 0.9 | 0.4 | | | 3~5/60 |
| 1.0 | 0.4 | | | 3~5/60 |
| 1.2 | 0.4 | | | 0/60 |
| 1.4 | 0.4 | | | 0/60 |
| 1.6 | 0.4 | | | 0/60 |

As will be understood from comparison between Table 1(a) and Table 1(b), the number of non-separation increases when the average grain diameter is not greater than 1.0 μm in the case in which machining was made by lathing. On the other hand, if machining is made by milling, the number of non-separation does not increase even if the average grain diameter is not greater than 1.0 μm. Thus, if the grooves 60 are formed by milling, the high level of separability can be maintained even if the average grain diameter is small, such as 1.0 μm or smaller.

Table 2 shows data about the interval W and the depth D of the grooves 60 formed by milling. Table 2(a) shows a case in which a ball end mill having a tip radius of 3 mm was used, whereas Table 2(b) shows a case in which a ball end mill having the tip radius of 5 mm was used.

TABLE 2

Groove Interval/Depth
Machining method: Milling
Average Grain Diameter: 0.8 μm

| Groove Depth(μm) | Groove Interval (mm) | Surface Roughness Ra(μm) | Number of Non-separation |
|---|---|---|---|
| (a) Ball end mill tip radius: 3 mm | | | |
| 0.1 | 0.05 | 0.025 | |
| 0.4 | 0.1 | 0.1 | 0/60 |
| 1.6 | 0.2 | 0.4 | 0/60 |
| 3.0 | 0.3 | 0.8 | 0/60 |
| 10.0 | 0.5 | 3.2 | 0/60 |
| 42.0 | 1.0 | 12.5 | 0/60 |
| 170.0 | 2.0 | 50 | 0~1/60 |
| (b) Ball end mill tip radius: 5 mm | | | |
| 0.06 | 0.05 | 0.025 | |
| 0.25 | 0.1 | 0.05 | 0/60 |
| 1.0 | 0.2 | 0.2 | 0/60 |
| 2.0 | 0.3 | 0.4 | 0/60 |
| 6.0 | 0.5 | 1.6 | 0/60 |
| 25.0 | 1.0 | 6.3 | 0/60 |
| 100.0 | 2.0 | 25 | 0/60 |
| 670.0 | 2.5 | | 0~2/60 |

From numbers of non-separation shown in Table 2(a) and (b), it is observed that good results can be obtained if the surface roughness is not smaller than Ra=0.05 μm. Particularly, combinations indicated by an asterisk (*) are preferable in terms of a rate of acceptable compacts and productivity. Further, another series of experiments were made with the average grain diameter of 0.8 μm, in which two sets of surface conditions were prepared for milling: i.e. surface roughness Ra=0.8 μm, depth of the grooves 60 D=10.0 μm, and the interval of the grooves 60 W=0.2 mm; and surface roughness Ra=0.1 μm, depth of the grooves 60 D=0.2 μm, and the interval of the grooves 60 W=0.1 mm. In either case, the number of non-separation per 60 strokes was 0. From these results, it is observed that the interval W of the grooves 60 should preferably be 0.1 mm~2.0 mm, and the depth D of the grooves 60 should preferably be 0.2 μm~100.0 μm.

As a reference, when the lower punch 14 was machined by electric discharge to the surface roughness Ra=0.8 μm, the number of non-separation per 60 strokes was 2. As will be reconfirmed from this result, the separability is improved if the grooves 60 are formed on the contacting surface 56 of the lower punch 14.

Figure 7:
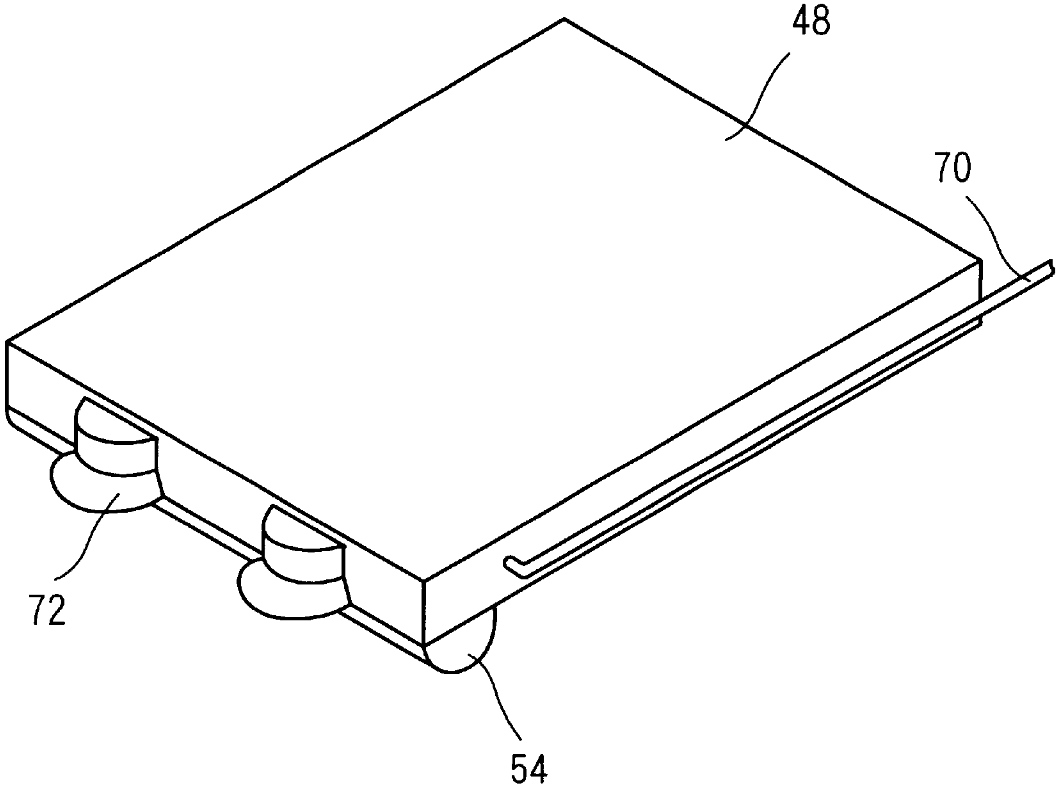
FIG. 7 is a perspective view showing an unloader used in another embodiment of the present invention.

Next, reference is made to FIGS. 1 and 7 for description of a powder pressing apparatus 10*a* as another embodiment of the present invention.

According to the powder pressing apparatus 10*a*, the contacting surface 56 of the lower punch 14 is not formed with the grooves, but instead the apparatus is provided with a water spraying function. Otherwise, the apparatus 10*a* is the same as the apparatus 10, and therefore identical portions will not be further described.

The lower punch 14 of the powder pressing apparatus 10*a* is machined by a discretionary method such as lapping, lathe, and electric discharge. Further, the unloader 48 is, as indicated by a single-dotted line in FIG. 1, and more clearly understood from FIG. 7, provided with a water supply pipe 70 for supplying water and retractable spraying nozzles 72 for spraying water.

With the above arrangement, operations of the powder pressing apparatus 10a will be described with reference to FIG. 8(*a*) through FIG. 8(*d*), FIG. 9(*a*) and FIG. 9(*b*). Operations shown in FIG. 8(*a*) through FIG. 8(*d*) are the same as those in FIG. 5(*a*) through FIG. 5(*d*) however, and therefore these operations will not be repeatedly described.

Figure 8:
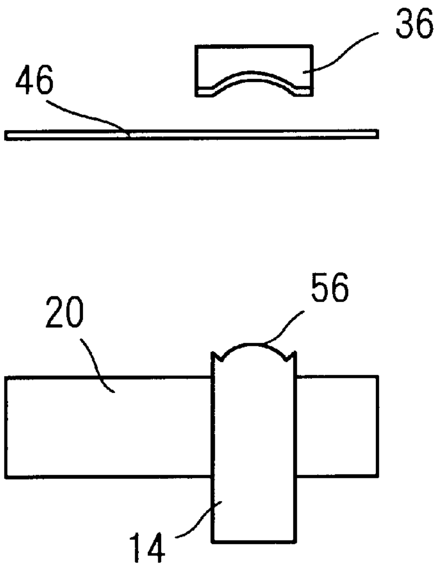
FIG. 8(*a*) through FIG. 8(*d*) are illustrations showing steps of operations according to the above another embodiment.
Figure 8:
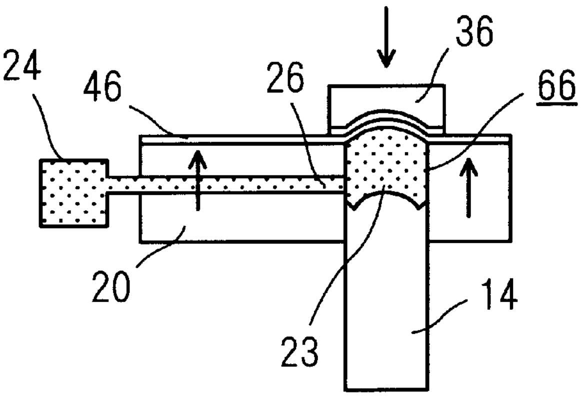
Figure 8:
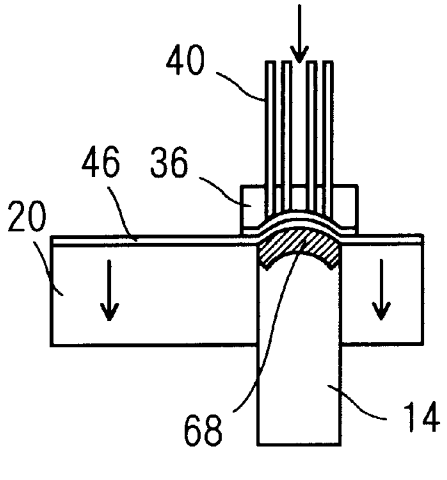
Figure 8:
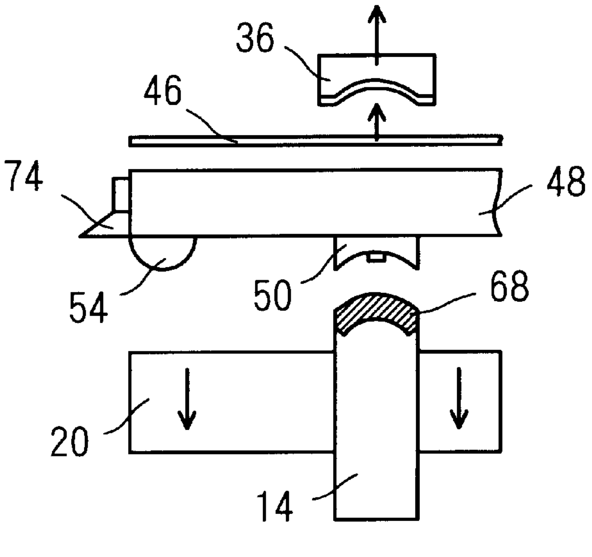
Figure 9:
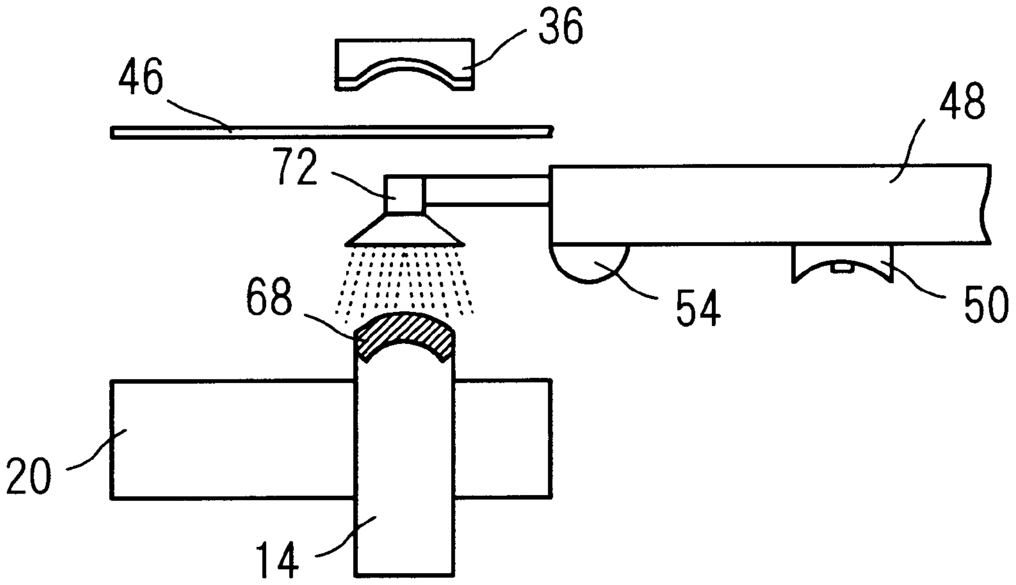
FIG. 9(*a*) and FIG. 9(*b*) are illustrations showing steps following the steps shown in FIG. 8(*a*) and FIG. 8(*b*) respectively.
Figure 9:
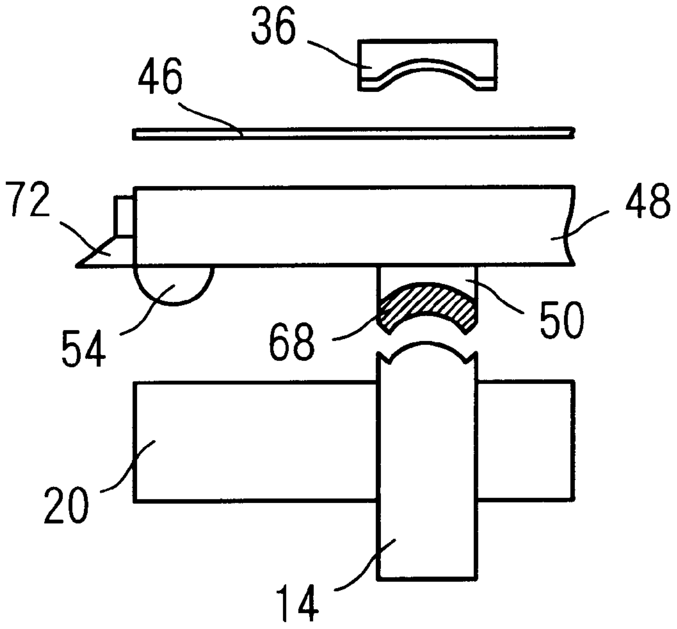

According to the powder pressing apparatus 10*a*, if the compact 68 cannot be removed from the lower punch 14 in the step shown in FIG. 8(*d*), then the spray nozzles 72 of the unloader 48 are popped out as shown in FIG. 9(*a*), and water is sprayed to the upper surface of the compact 68. Then, the water percolates into the compact 68 and is drawn in between the lower surface of the compact 68 and the contacting surface 56 of the lower punch 14.

After the water is sprayed as above, two or three seconds of waiting time is allowed and then, as shown in FIG. 9(*b*), the compact 68 is removed by the unloader 48. Thereafter, the unloader 48 is moved horizontally, the separating agent is sprayed from the spray nozzles 54 to the contacting surface 56 of the lower punch 14, and the unloader 48 is moved away from above the lower punch 14.

According to the powder pressing apparatus 10*a* as described above, by spraying water from above the compact 68 which is already squeezed of water, the compact 68 is bulged/deformed, and made afloat from the lower punch 14 by an enhanced spring back force, creating a gap between the compact 68 and the lower punch 14 for easier separation. Thus, fracture/crack of the compact 68 at the time of collecting can be reduced, the yield of product is improved, and the operation efficiency is improved. In this step of operation, it is presumed that there is a near vacuum between the compact 68 and the lower punch 14, which promotes the percolation of the water. Thus, if the water is sprayed from above the compact 68, the percolation of the water is presumed to be accelerated also by gravity, allowing the water to be drawn in more easily between the compact 68 and the lower punch 14, eliminating the vacuum.

Further, water that is used as a liquid for the spray percolates easily into the compact 68, making shorter a required time till the compact 68 separates from the lower punch 14.

Next, results of an experiment using the powder pressing apparatus 10*a* are shown in Table 3.

The Table 3 compares the number of non-separation from the lower punch 14 of the powder pressing apparatus 10*a* machined by a different method of lapping, lathe and the electric discharge, under two conditions, i.e. "without water spray" and "after water spray." The lapping method used herein refers to a method of manual mirror finishing operation, whereas the lathe method refers to machine grinding by a cutter contacted to a turning object, and the electric discharge method refers to a method of grinding an object by heat, instead of a cutter, generated by electric discharge.

TABLE 3

| Machining Method | Surface Roughness Ra (μm) | Average Grain Diameter (μm) | Shape of Compact | Number of non-separation: Without water spray | Number of non-separation: After water spray |
|---|---|---|---|---|---|
| Lapping | 0.05 | 0.5 | Round | 10–15/60 | 1–3 |
| | | 0.65 | Angled | 4–6/60 | 0–1 |
| | | 0.8 | Arc | 0–1/60 | 0 |
| | | 1.0 | | 0/60 | 0 |
| Lathe | 0.8 | 0.5 | Round | 10–15/60 | 2–5 |
| | | 0.65 | | 5–8/60 | 1–3 |
| | | 0.8 | | 3–5/60 | 0 |
| | | 1.0 | | 0/60 | 0 |
| Electric Discharge | 1.6 | 0.5 | Round | 5–8/60 | 0–3 |
| | | 0.65 | Angled | 2-3/60 | 0 |
| | | 0.8 | Arc | 0–1/60 | 0 |
| | | 1.0 | | 0/60 | 0 |

As understood from Table 3, for all methods of machining, the separability is improved "after water spray" with the number of non-separation being significantly smaller.

It should be noted here that separability improvement of the compact 68 by the water spray may also be performed in the powder pressing apparatus 10 that uses the lower punch 14 formed with the grooves 60 if the compact 68 cannot be removed from the lower punch 14.

Further, according to the above embodiments, description was made for a case where the compact 68 adheres to the lower punch 14. However, the present invention is not limited to this, but is also applicable to a case where the compact 68 adheres to the upper punch 32. In such a case, the grooves should be made on the upper punch 32, i.e. a surface of the punch portions 36. Likewise, when the water is sprayed, the spray is applied to the compact 68 adhering to the upper punch 32.

Further, the liquid for spraying may be alcohol.

Further, the present invention is also applicable to a dry pressing.

Still further, when milling is performed, a ball end mill or a flat end mill is selectively used depending on the shape of the compact 68. In addition, a pick-feed operation may be performed during the-milling.

The present invention being described and illustrated in detail thus far, it is obvious that these description and drawings only represent an example of the present invention, and should not be interpreted as limiting the invention. The spirit and scope of the present invention is only limited by words used in the accompanied claims.

What is claimed is:

1. A powder pressing apparatus for formation of a compact by pressing a powder loaded in a cavity formed by an upper punch, a lower punch and a die, wherein at least either one of the upper punch and the lower punch has a contacting surface for contact with the compact, the contacting surface formed into a curve and having a groove running along said curve.

2. The apparatus according to claim 1, wherein the groove is formed at least at an end portion of the contacting surface.

3. A powder pressing apparatus for formation of a compact by pressing a powder loaded in a cavity formed by an upper punch, a lower punch and a die, wherein at least either one of the upper punch and the lower punch has a contacting surface for contact with the compact, formed with a groove, wherein the contacting surface has a surface roughness Ra=0.05 $\mu$m~25 $\mu$m.

4. A powder pressing apparatus for formation of a compact by pressing a powder loaded in a cavity formed by an upper punch, a lower punch and a die, wherein at least either one of the upper punch and the lower punch has a contacting surface for contact with the compact, formed with a groove, wherein the powder has an average grain diameter not greater than 1 $\mu$m.

5. The apparatus according to claim 1, wherein the groove is formed at an interval of 0.1 mm~2.0 mm, to a depth of 0.2 $\mu$m~100.0 $\mu$m.

6. A powder pressing apparatus for formation of a compact by pressing a powder loaded in a cavity formed by an upper punch, a lower punch and a die, wherein at least either one of the upper punch and the lower punch has a contacting surface for contact with the compact, formed with a groove, further comprising liquid spraying means for spraying a liquid to the compact formed by pressing the powder and adhered to the upper punch or the lower punch.

7. A powder pressing apparatus for formation of a compact by pressing a powder loaded in a cavity formed by an upper punch, a lower punch and a die, wherein the apparatus comprises liquid spraying means for spraying a liquid to the compact formed by pressing the powder and adhered to the upper punch or the lower punch.

8. The apparatus according to claim 7, wherein the liquid is water.

9. A powder pressing apparatus for formation of a compact by pressing a powder loaded in a cavity formed by an upper punch, a lower punch and a die, wherein at least either one of the upper punch and the lower punch has a contacting surface for contact with the compact, formed with a groove, used in wet pressing.

10. A punch used in a powder pressing apparatus for formation of a compact by pressing a powder, wherein the punch has a contacting surface for contact with the compact, the contacting surface formed into a curve and having a groove running along said curve.

11. The punch according to claim 10, wherein the groove is formed at least at an end portion of the contacting surface.

12. A punch used in a powder pressing apparatus for formation of a compact by pressing a powder, wherein the punch has a contacting surface for contact with the compact, formed with a groove, and wherein the contacting surface has a surface roughness Ra=0.05 $\mu$m~25 $\mu$m.

13. A punch used in a powder pressing apparatus for formation of a compact by pressing a powder, wherein the punch has a contacting surface for contact with the compact, formed with a groove, and wherein the powder has an average grain diameter not greater than 1 $\mu$m.

14. The punch according to claim 10, wherein the groove is formed at an interval of 0.1 mm~2.0 mm, to a depth of 0.2 $\mu$m~100.0 $\mu$m.

15. A punch used in a powder pressing apparatus for formation of a compact by pressing a powder, wherein the punch has a contacting surface for contact with the compact, formed with a groove, and used in a wet pressing.

16. A method for pressing powder comprising:

a first step of forming a compact by pressing a powder loaded in a cavity formed by an upper punch, a lower punch and a die;

a second step of spraying a liquid to the compact adhering to the upper punch or the lower punch; and a third step of removing the compact from the upper punch or the lower punch to which the compact adheres, after spraying the liquid.

17. The method according to claim 16, wherein the liquid is water.

18. The method according to claim 16 or 17, used in a wet pressing.

19. A method for manufacturing a punch used in a powder pressing apparatus for formation of a compact, wherein the method comprises a step of forming a groove in a contacting surface of the punch which is to contact the compact, the contacting surface formed into a curve and having a groove running along said curve.

20. The method according to claim 19, wherein the groove is formed by milling.

21. A method for manufacturing a punch used in a powder pressing apparatus for formation of a compact, wherein the method comprises a step of forming a groove in a contacting surface of the punch which is to contact the compact, wherein the method is used in manufacture of the punch for a wet pressing.

22. A powder pressing apparatus for formation of a compact by pressing a powder loaded in a cavity formed by an upper punch, a lower punch and a die, wherein at least either one of the upper punch and the lower punch has a contacting surface for contact with the compact, the contacting surface having substantially wavy grooves at an interval of said groove.

23. The apparatus according to claim 22, wherein the groove is formed at least at an end portion of the contacting surface.

24. The apparatus according to claim 22, wherein the groove is formed at an interval of 0.1 mm~2.0 mm, to a depth of 0.2 $\mu$m~100.0 $\mu$m.

25. A punch used in a powder pressing apparatus for formation of a compact by pressing a powder, wherein the punch has a contacting surface for contact with the compact, the contacting surface having substantially wavy grooves at an interval of said groove.

26. The punch according to claim 25, wherein the groove is formed at least at an end portion of the contacting surface.

27. The punch according to claim 25, wherein the groove is formed at an interval of 0.1 mm~2.0 mm, to a depth of 0.2 $\mu$m~100.0 $\mu$m.

28. A method for manufacturing a punch used in a powder pressing apparatus for formation of a compact, wherein the method comprises a step of forming a groove in a contacting surface of the punch which is to contact the compact, the contacting surface having substantially wavy grooves at an interval of said groove.

29. The method according to claim 28, wherein the groove is formed by milling.

* * * * *